(12) United States Patent
Hancock, Jr. et al.

(10) Patent No.: US 12,344,555 B2
(45) Date of Patent: *Jul. 1, 2025

(54) TEXTURED GLASS ARTICLES AND METHODS OF MAKING SAME

(71) Applicant: Corning Incorporated, Corning, NY (US)

(72) Inventors: Robert Randall Hancock, Jr., Corning, NY (US); Yuhui Jin, Painted Post, NY (US); Aize Li, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 542 days.

This patent is subject to a terminal disclaimer.

(21) Appl. No.: 17/462,861

(22) Filed: Aug. 31, 2021

(65) Prior Publication Data

US 2022/0073412 A1  Mar. 10, 2022

Related U.S. Application Data

(60) Provisional application No. 63/074,761, filed on Sep. 4, 2020.

(51) Int. Cl.
*C03C 3/091* (2006.01)
*C03C 3/085* (2006.01)
(Continued)

(52) U.S. Cl.
CPC .............. *C03C 3/091* (2013.01); *C03C 3/085* (2013.01); *C03C 3/097* (2013.01); *C03C 15/00* (2013.01);
(Continued)

(58) Field of Classification Search
CPC ......... C03C 3/091; C03C 3/085; C03C 3/097; C03C 15/00
See application file for complete search history.

(56) References Cited

U.S. PATENT DOCUMENTS

2011/0201490 A1* 8/2011 Barefoot ............... C03B 33/091
501/66
2016/0320643 A1* 11/2016 Lee ........................ H10K 50/84
(Continued)

FOREIGN PATENT DOCUMENTS

| CN | 111233339 A | 6/2020 |
| CN | 112062475 A | 12/2020 |
| EP | 1614665 A1 | 1/2006 |

OTHER PUBLICATIONS

International Search Report and Written Opinion of the International Searching Authority; PCT/US2021/048451; dated Dec. 2, 2021; pp. 12; European Patent Office.

*Primary Examiner* — Bryan D. Ripa
*Assistant Examiner* — Cameron K Miller

(57) ABSTRACT

A textured glass article includes: a body comprising an aluminosilicate glass comprising greater than or equal to 16 wt % $Al_2O_3$ and a $Al_2O_3/SiO_2$ ratio less than or equal to 0.3, the body having at least a first surface; a plurality of polyhedral surface features extending from the first surface, each of the plurality of polyhedral surface features comprising a base on the first surface, a plurality of facets extending from the first surface, and a surface feature size at the base greater than or equal to 10 μm and less than or equal to 100 μm, wherein the plurality of facets of each polyhedral surface feature converge toward one another; and a transmittance haze greater than or equal to 50%.

15 Claims, 10 Drawing Sheets

(51) Int. Cl.
*C03C 3/097* (2006.01)
*C03C 15/00* (2006.01)
*C03C 23/00* (2006.01)
*C09K 13/08* (2006.01)

(52) U.S. Cl.
CPC ...... *C03C 23/0075* (2013.01); *C03C 23/0085* (2013.01); *C09K 13/08* (2013.01)

(56) References Cited

U.S. PATENT DOCUMENTS

| | | |
|---|---|---|
| 2018/0141854 A1 | 5/2018 | Huang |
| 2018/0215657 A1* | 8/2018 | Jin .......................... C03C 19/00 |
| 2023/0060615 A1* | 3/2023 | Hancock, Jr. ........... C03C 3/091 |

* cited by examiner

TEXTURED GLASS ARTICLES AND METHODS OF MAKING SAME

CROSS-REFERENCE TO RELATED APPLICATIONS

The present specification claims the benefit of U.S. Provisional Application Ser. No. 63/074,761 filed Sep. 4, 2020 and entitled "Textured Glass Articles and Methods of Making Same," the entirety of which is incorporated by reference herein.

FIELD

The present specification generally relates to glass articles and, in particular, to glass articles having a highly reflective appearance and/or an enhanced tactile impression.

TECHNICAL BACKGROUND

Aluminosilicate glass articles may exhibit superior ion-exchangeability and drop performance. Various industries, including the consumer electronics industry, desire reflective and/or textured materials with the same or similar strength and fracture toughness properties. However, conventional texturing processes may not produce the desired appearance and/or texture on certain aluminosilicate glass articles.

Accordingly, a need exists for an alternative method to produce aluminosilicate glass articles having a highly reflective appearance and/or an enhanced tactile impression.

SUMMARY

According to a first aspect A1, a textured glass article may comprise: a body comprising an aluminosilicate glass comprising greater than or equal to 16 wt % $Al_2O_3$ and a $Al_2O_3/SiO_2$ ratio less than or equal to 0.3, the body having at least a first surface; a plurality of polyhedral surface features extending from the first surface, each of the plurality of polyhedral surface features comprising a base on the first surface, a plurality of facets extending from the first surface, and a surface feature size at the base greater than or equal to 10 µm and less than or equal to 100 µm, wherein the plurality of facets of each polyhedral surface feature converge toward one another; and a transmittance haze greater than or equal to 50%.

A second aspect A2 includes the textured glass article according to the first aspect A1, wherein the plurality of facets of each polyhedral surface feature converge toward one another to form at least one apex, the at least one apex being sharp, rounded, or truncated.

A third aspect A3 includes the textured glass article according to the first aspect A1 or the second aspect A2, wherein the textured glass article has a surface roughness Ra greater than or equal to 1 µm.

A fourth aspect A4 includes the textured glass article according to any one of the first through third aspects A1-A3, wherein the base of each of the plurality of polyhedral surface features comprises at least three sides, at least one side converging toward at least another side.

A fifth aspect A5 includes the textured glass article according to any one of the first through fourth aspects A1-A4, wherein each of the plurality of polyhedral surface features comprises a dendritic structure extending from the base.

A sixth aspect A6 includes the textured glass article according to any one of the first through fifth aspects A1-A5, wherein the textured glass article has a location of peak maximum (peak GU) greater than or equal to 50 GU and less than or equal to 150 GU.

A seventh aspect A7 includes the textured glass article according to any one of the first through sixth aspects A1-A6, wherein the textured glass article has a full width at half maximum greater than or equal to 10 GU and less than or equal to 70 GU.

An eighth aspect A8 includes the textured glass article according to any one of the first through seventh aspects A1-A7, wherein the textured glass article has a range of GU values greater than or equal to 100 GU and less than or equal to 300 GU.

A ninth aspect A9 includes the textured glass article according to any one of the first through eighth aspects A1-A8, wherein the textured glass article has a skewness greater than or equal to 0.05 and less than or equal to 0.7.

A tenth aspect A10 includes the textured glass article according to any one of the first through ninth aspects A1-A9, wherein the textured glass article has an excess kurtosis greater than or equal to 0.5 and less than or equal to 3.

An eleventh aspect A11 includes the textured glass article according to any one of the first through tenth aspects A1-A10, wherein the textured glass article comprises: greater than or equal to 52 wt % and less than or equal to 67 wt % $SiO_2$; greater than or equal to 16 wt % and less than or equal to 28 wt % $Al_2O_3$; greater than or equal to 0 wt % and less than or equal to 5 wt % $B_2O_3$; greater than or equal to 8 wt % and less than or equal to 15 wt % $Na_2O$; greater than or equal to 0 wt % and less than or equal to 0.2 wt % $K_2O$; greater than or equal to 0 wt % and less than or equal to 4 wt % $Li_2O$; and greater than or equal to 0 wt % and less than or equal to 5 wt % MgO.

A twelfth aspect A12 includes the textured glass article according to any one of the first through eleventh aspects A1-A11, wherein the textured glass article is an electronic device back cover.

According to a thirteenth aspect A13, a textured glass article may comprise: a body comprising an aluminosilicate glass comprising greater than or equal to 16 wt % $Al_2O_3$ and a $Al_2O_3/SiO_2$ ratio greater than 0.3, the body having at least a first surface; a plurality of dendritic surface features extending from the first surface, each of the plurality of dendritic surface features comprising a base on the first surface, and a surface feature size at the base greater than 100 µm and less than or equal to 350 µm; and a transmittance haze greater than or equal to 50%.

A fourteenth aspect A14 includes the textured glass article according to the thirteenth aspect A13, wherein the textured glass article has a surface roughness Ra greater than or equal to 2 µm.

A fifteenth aspect A15 includes the textured glass article according to the thirteenth aspect A13 or the fourteenth aspect A14, wherein the aluminosilicate glass comprises: greater than or equal to 52 wt % and less than or equal to 62 wt % $SiO_2$; greater than or equal to 16 wt % and less than or equal to 28 wt % $Al_2O_3$; greater than or equal to 0 wt % and less than or equal to 5 wt % $B_2O_3$; greater than or equal to 8 wt % and less than or equal to 13 wt % $Na_2O$; greater than or equal to 0 wt % and less than or equal to 0.2 wt % $K_2O$; greater than or equal to 0 wt % and less than or equal to 4 wt % $Li_2O$; and greater than or equal to 0 wt % and less than or equal to 1.5 wt % MgO.

A sixteenth aspect A16 includes the textured glass article according any one of the thirteenth through fifteenth aspects A13-A15, wherein the textured glass article is an electronic device back cover.

According to a seventeenth aspect A17, a method of forming a textured glass article may comprise: contacting an aluminosilicate glass article with an etchant, wherein the aluminosilicate glass article comprises greater than or equal to 16 wt % $Al_2O_3$ and has at least one surface and the etchant comprises a pH less than or equal to 3.0; washing the aluminosilicate glass article; and drying the aluminosilicate glass article to form the textured glass article, the textured glass article comprising a plurality of surface features extending from a first surface of the textured glass article, each of the plurality of surface features comprising a base on the first surface, and a surface feature size at the base greater than or equal to 10 µm and less than or equal to 350 µm, wherein the textured glass article has a transmittance haze greater than or equal to 50%.

An eighteenth aspect A18 includes the method according to the seventeenth aspect A17, wherein the aluminosilicate glass article comprises a $Al_2O_3/SiO_2$ ratio less than or equal to 0.3, wherein the plurality of surface features are polyhedral surface features, and wherein the surface feature size at the base greater than or equal to 10 µm and less than or equal to 100 µm.

A nineteenth aspect A19 includes the method according to the eighteenth aspect A18, wherein contacting the aluminosilicate glass article with the etchant generates a greater amount of silicon-based precipitate than aluminum-based precipitate.

A twentieth aspect A20 includes the method according to the seventeenth aspect A17, wherein the aluminosilicate glass article comprises a $Al_2O_3/SiO_2$ ratio greater than to 0.3, wherein the plurality of surface features are dendritic surface features, and wherein the surface feature size at the base greater than 100 µm and less than or equal to 350 µm.

A twenty-first aspect A21 includes the method according to the twentieth aspect A20, wherein contacting the aluminosilicate glass article with the etchant generates a greater amount of aluminum-based precipitate than silicon-based precipitate.

A twenty-second aspect A22 includes the method according to any one of the seventeenth through twenty-first aspects A17-A21, wherein the etchant comprises: greater than or equal to 20 wt % and less than or equal to 40 wt % of a salt; and greater than or equal to 30 wt % and less than or equal to 65 wt % of an acid.

A twenty-third aspect A23 includes the method according to the twenty-second aspect A22, wherein the salt comprises ammonium chloride, ammonium fluoride, ammonium bifluoride, ammonium sulfate, ammonium nitrate, potassium sulfate, potassium chloride, potassium fluoride, potassium bifluoride, potassium nitrate, sodium chloride, sodium fluoride, sodium bifluoride, or combinations thereof.

A twenty-fourth aspect A24 includes the method according to the twenty-second aspect A22 or the twenty-third aspect A23, wherein the acid comprises hydrochloric acid, hydrofluoric acid, nitric acid, sulfuric acid, oxalic acid, acetic acid, sodium bisulfate, or combinations thereof.

A twenty-fifth aspect A25 includes the method according to any one of the seventeenth through twenty-fourth aspects A17-A24, wherein the etchant comprises: greater than or equal to 20 wt % and less than or equal to 40 wt % ammonium fluoride; greater than or equal to 25 wt % and less than or equal to 45 wt % nitric acid; greater than or equal to 5 wt % and less than or equal to 20 wt % hydrofluoric acid; and greater than or equal to 20 wt % and less than or equal to 40 wt % water.

A twenty-sixth aspect A26 includes a consumer electronic device, comprising: a housing having a front surface, a back surface, and side surfaces; and electrical components provided at least partially within the housing, the electrical components including at least a controller, a memory, and a display, the display being provided at or adjacent the front surface of the housing; wherein the back surface of the housing includes the textured glass article according to the first aspect A1.

Additional features and advantages of the textured glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
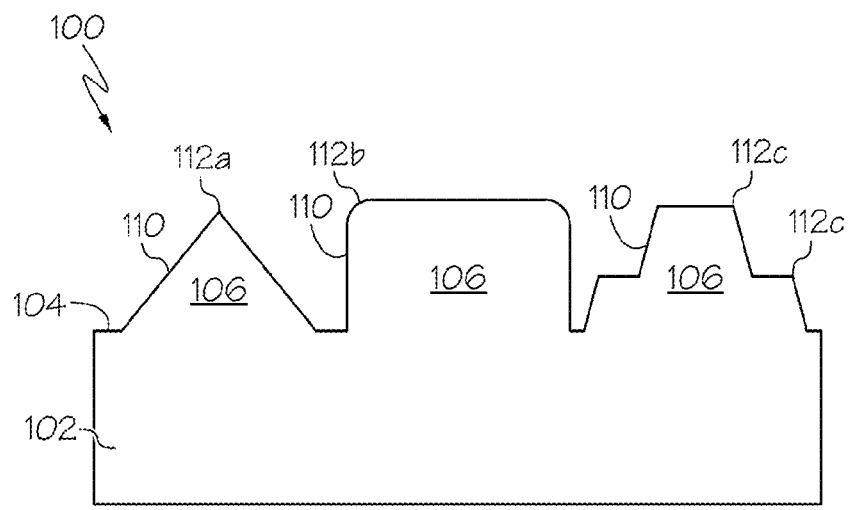
FIG. 1 schematically depicts a perspective view of a textured glass article, according to one or more embodiments shown and described herein.

Reference will now be made in detail to various embodiments of textured glass articles having a highly reflective appearance and/or an enhanced tactile impression. According to embodiments, a textured glass article includes: a body comprising an aluminosilicate glass comprising greater than or equal to 16 wt % $Al_2O_3$ and a $Al_2O_3/SiO_2$ ratio less than or equal to 0.3, the body having at least a first surface; a plurality of polyhedral surface features extending from the first surface, each of the plurality of polyhedral surface features comprising a base on the first surface, a plurality of facets extending from the first surface, and a surface feature size at the base greater than or equal to 10 μm and less than or equal to 100 μm, wherein the plurality of facets of each polyhedral surface feature converge toward one another; and a transmittance haze greater than or equal to 50%. According to other embodiments, a textured glass article includes: a body comprising an aluminosilicate glass comprising greater than or equal to 16 wt % $Al_2O_3$ and a $Al_2O_3/SiO_2$ ratio greater than 0.3, the body having at least a first surface; a plurality of dendritic surface features extending from the first surface, each of the plurality of dendritic surface features comprising a base on the first surface, and a surface feature size at the base greater than 100 μm and less than or equal to 350 μm, wherein the plurality of facets of each polyhedral surface feature converge toward one another; and a transmittance haze greater than or equal to 60%. Various embodiments of textured glass articles and methods of making the same will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions described herein, the concentrations of constituent components (e.g., $SiO_2$, $Al_2O_3$, and the like) are specified in weight percent (wt %) on an oxide basis, unless otherwise specified.

X-ray diffraction (XRD) spectrum, as described herein, is measured with a D8 ENDEAVOR X-ray Diffraction system with a LYNXEYE XE-T detector manufactured by Bruker Corporation (Billerica, MA).

Confocal images, as described herein, are obtained using Leica DCM8 microscope, with associated LeicaSCAN software package, at 50× magnification. Surface feature size and surface roughness of the textured glass articles are measured using the confocal images. Transmittance haze, transmission, and 450 nm reflectance of the textured glass articles are analyzed using Ci7800 Spectrophotometer courtesy of Pantone x-Rite, with associated iColor analysis program.

"Surface feature size" refers to the mean longest dimension across the cross section of the base of the 10 largest surface features from three different locations in the confocal image. Accordingly, the longest dimension of the 10 largest surface features from three different locations are measured. The mean value of the 30 feature size measurements is calculated to obtain the surface feature size of the textured glass article.

"Surface roughness ('Ra')," as described herein, refers to the surface texture of a textured glass article quantified by the arithmetic average of the absolute values of the profile height deviations from the mean line, recorded within the evaluation length. Values reported herein are reported in microns, or μm, unless otherwise expressly stated.

"Transmittance haze," as described herein, refers to the ratio of transmitted light scattered at an angle greater than 2.5° from normal to all transmitted light over the total transmission. Transmittance haze, as described herein, is measured with a wavelength range of 360 nm to 750 nm at a thickness of 0.8 mm, unless otherwise indicated.

"Transmission," as used herein, refers to the average of transmission made within a given wavelength range. In the embodiments described herein, "transmission" is reported over the wavelength range of 360 nm to 750 nm at a thickness of 0.8 mm, unless otherwise indicated.

"450 nm reflectance," as used herein, refers to the reflectance made at the wavelength of 450 nm at a thickness of 0.8 mm, unless otherwise indicated.

"Surface feature height," as described herein, refers to the distance between the base of the surface feature and the topmost apex of the surface feature.

"Facet angle," as described herein, refers to the angle between a plane normal to a first surface of the aluminosilicate glass article and the facet. The facet angle is measured by arctan (height/half length) of the surface feature.

Grayscale distributions, as described herein, were collected by illuminating an article with a high intensity white LED (Metaphaser LED Light Engine, Metaphase Technologies, Bristol, PA, USA) coupled to a fiber optic light guide. Light reflected off the surface of the artice was collected by a camera/lens combination (Stingray F-125B, Allied Vision Technologies Gmbh, Stadtroda, Germany and M112FM50, Tamron Co., Ltd., Saitama, Japan). The lens aperture was f/2.8, the working distance was approximately 300 mm, the exposure time was 6 ms, and the gain was set to 0 db. The images collected were used to calculate the location of peak maximum, full width at half maximum, range of location of peak maximum values, skewness, and excess kurtosis of the textured glass articles described herein, such as the resultant textured glass articles shown in Table 9.

"GU," as described herein, refers to a grayscale unit.

"Location of peak maximum ('peak GU')," as described herein and calculated from images collected by reflecting light off the surface of the article, refers to the grayscale value where the amplitude is maximized.

"Full width at half maximum ('FWHM')," as described herein and calculated from images collected by reflecting light off the surface of the article, refers to the width of a curve measured between those points on the y-axis which are half the maximum amplitude.

"Range of GU values," as described herein and calculated from images collected by reflecting light off the surface of the article, refers to the difference between the highest grayscale value and the lowest grayscale value in a given image.

"Skewness," as described herein and calculated from images collected by reflecting light off the surface of the article, refers to the asymmetry of a distribution of a real-values random variable about its mean. For reference, a normal distribution has a skewness equal to zero.

"Excess kurtosis," as described herein, refers to the kurtosis minus 3 and is used as a direct comparison to the standard normal distribution kurtosis.

"Polyhedral," when used to describe the structure of a surface feature on a textured glass article, refers to a three-dimensional shape with flat polygonal faces, straight edges.

"Dendritic," when used to describe the structure of a surface feature on a textured glass article, refers to a branching structure.

"Nitric acid," as described herein, refers to stock nitric acid solution, which contains 70 wt % nitric acid.

"Hydrofluoric acid," as described herein, refers to stock hydrofluoric acid solution, which contains 49 wt % hydrofluoric acid.

Etchants have been used to achieve textured surfaces on glass articles. For example, aluminosilicate glasses, which exhibit superior ion-exchangeability and drop performance, may be etched to produce reflective and/or textured materials with the same or similar strength and fracture toughness properties. However, simply etching an aluminosilicate glass comprising greater than or equal to 16 wt % $Al_2O_3$ may not produce the desired reflective appearance and/or an enhanced tactile impression.

Disclosed herein are textured glass articles and texturing methods which mitigate the aforementioned problems such that aluminosilicate glasses comprising greater than or equal to 16 wt % $Al_2O_3$ (which exhibit superior ion-exchangeability and drop performance) may be treated to produce the desired appearance and/or texture. Specifically, textured glass articles disclosed herein comprise an aluminosilicate glass having polyhedral surface features that provide a highly reflective appearance or comprise an aluminosilicate glass having dendritic surface features that have an enhanced tactile impression.

To produce the polyhedral surface features, the aluminosilicate glass article comprising greater than or equal to 16 wt % $Al_2O_3$ may have a $Al_2O_3/SiO_2$ ratio less than or equal to 0.3 such that the etchant having a pH less than or equal to 3.0 preferentially generates a silicon-based precipitate, which leads to polyhedral surface features, and minimizes the aluminum-based precipitate, which leads to dendritic surface features.

To produce the dendritic surface features, the aluminosilicate glass article comprising greater than or equal to 16 wt % $Al_2O_3$ may have a $Al_2O_3/SiO_2$ ratio greater than 0.3 such that the etchant having a pH less than 3 preferentially generates an aluminum-based precipitate, which leads to dendritic surface features, and minimizes the silicon-based precipitate, which leads to polyhedral surface features.

Polyhedral Surface Features

Figure 2:
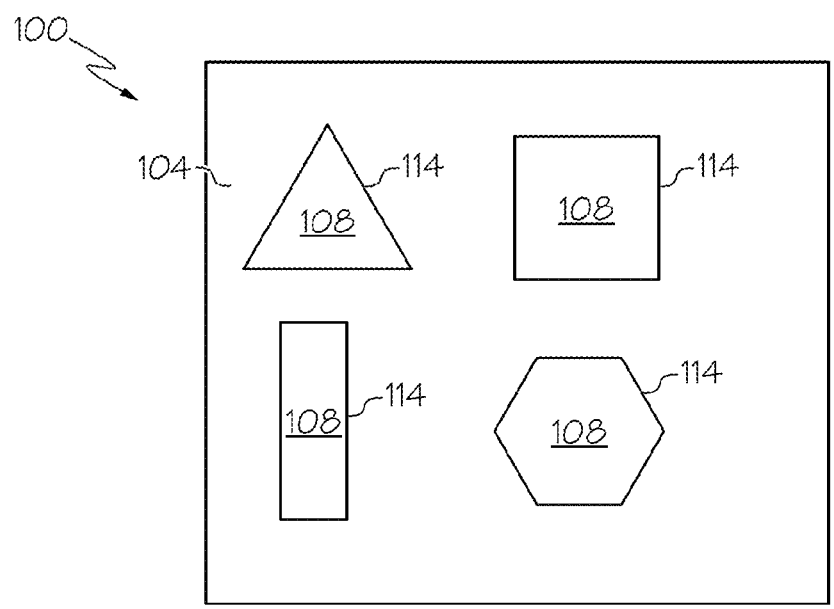
FIG. 2 schematically depicts a plan view, respectively, of a textured glass article, according to one or more embodiments shown and described herein.

Referring now to FIGS. 1 and 2, in embodiments, the textured glass articles 100 described herein have a body 102 including an aluminosilicate glass comprising greater than or equal to 16 wt % $Al_2O_3$ and a $Al_2O_3/SiO_2$ ratio less than or equal to 0.3. In embodiments, the aluminosilicate glass article may comprise greater than or equal to 52 wt % and less than or equal to 67 wt % $SiO_2$; greater than or equal to 16 wt % and less than or equal to 28 wt % $Al_2O_3$; greater than or equal to 0 wt % and less than or equal to 5 wt % $B_2O$; greater than or equal to 8 wt % and less than or equal to 15 wt % $Na_2O$; greater than or equal to 0 wt % and less than or equal to 0.2 wt % $K_2O$; greater than or equal to 0 wt % and less than or equal to 4 wt % $Li_2O$; and greater than or equal to 0 wt % and less than or equal to 5 wt % MgO. However, it should be understood that other aluminosilicate glasses are contemplated and possible, so long as the aluminosilicate glass has greater than or equal to 16 wt % $Al_2O_3$ and a $Al_2O_3/SiO_2$ ratio less than or equal to 0.3.

The body 102 includes at least a first surface 104. A plurality of polyhedral surface features 106 extend from the first surface 104. Each polyhedral surface feature 106 includes a base 108 on the first surface 104 and a plurality of facets 110 extending from the first surface 104.

In embodiments, the facets 110 of each polyhedral surface feature 106 extend from the first surface 104 and converge toward one another to form the polyhedral morphology (e.g., pyramidal with 3-fold symmetry, 4-fold symmetry, 6-fold symmetry, etc.) of the polyhedral surface features 106. In embodiments, the facets 110 of each polyhedral surface feature 106 converge toward each other at a facet angle greater than or equal to 0.5° and less than or equal to 12°. In embodiments, the facets 110 may be triangular, rectangular, or trapezium. In embodiments, the facets 110 converge to form at least one apex 112a, 112b, 112c. In embodiments, the apex may be a sharp apex 112a, a rounded apex 112b, or a truncated apex 112c.

The base 108 of each polyhedral surface feature 106 comprises at least three sides 114. At least one side 114 of the base 108 converges toward at least another side 114. In embodiments, the base 108 may be triangular, rectangular, or hexagonal. In embodiments, a surface feature size at the base 108 may be greater than or equal to 10 µm and less than or equal to 100 µm. In embodiments, the surface feature size at the base 108 may be greater than or equal to 10 µm, greater than or equal to 25 µm, or even greater than or equal to 50 µm. In embodiments, the surface feature size at the base 108 may be less than or equal to 100 µm, less than or equal to 95, or even less than or equal to 90 µm. In embodiments, the surface feature size at the base 108 may be greater than or equal to 10 µm and less than or equal to 100 µm, greater than or equal to 10 µm and less than or equal to 95 µm, greater than or equal to 10 µm and less than or equal to 90 µm, greater than or equal to 25 µm and less than or equal to 100 µm, greater than or equal to 25 µm and less than or equal to 95 µm, greater than or equal to 25 µm and less than or equal to 90 µm, greater than or equal to 50 µm and less than or equal to 100 µm, greater than or equal to 50 µm and less than or equal to 95 µm, or even greater than or equal to 50 µm and less than or equal to 90 µm, or any and all sub-ranges formed from any of these endpoints.

In embodiments, the textured glass article 100 may have a surface roughness Ra greater than or equal to 1 µm or even greater than or equal to 1.5 µm. In embodiments, the textured glass article 100 may have a surface roughness Ra less than or equal to 2 µm or even less than or equal to 1.8 µm. In embodiments, the textured glass article 100 may have a surface roughness Ra greater than or equal to 1 µm and less than or equal to 2 µm, greater than or equal to 1 µm and less than or equal to 1.8 µm, greater than or equal to 1.5 µm and less than or equal to 2 µm, or even greater than or equal to 1.5 µm and less than or equal to 1.8 µm, or any and all sub-ranges formed from any of these endpoints.

The transmittance haze of the textured glass article 100 may be correlated to the surface roughness Ra in that a relatively greater transmittance haze may imply that the textured glass article 100 has a relatively greater surface roughness Ra. In embodiments, the textured glass article 100 may have a transmittance haze greater than or equal to 50%, greater than or equal to 60%, or even greater than or equal to 70%. In embodiments, the textured glass article 100 may have a transmittance haze less than or equal to 98%, less than or equal to 95%, or even less than or equal to 90%. In embodiments, the textured glass article 100 may have a transmittance haze greater than or equal to 50% and less than or equal to 98%, greater than or equal to 50% and less than or equal to 95%, greater than or equal to 50% and less than or equal to 90%, greater than or equal to 60% and less than or equal to 98%, greater than or equal to 60% and less than or equal to 95%, greater than or equal to 60% and less than or equal to 90%, greater than or equal to 70% and less than or equal to 98%, greater than or equal to 70% and less than or equal to 95%, or even greater than or equal to 70% and less than or equal to 90%, or any and all sub-ranges formed from any of these endpoints.

In embodiments, a relatively high transmission of the textured glass article 100 allows for ink to be placed on the back of the textured glass article 100 (i.e., opposite the textured side) to provide a different color or pattern or to include text (e.g., company brand). In embodiments, the textured glass article 100 may have a transmission greater than or equal to 70% or even greater than or equal to 80%. In embodiments, the textured glass article 100 may have a transmission less than or equal to 99% or even less than or equal to 95%. In embodiments, the textured glass article 100 may have a transmission greater than or equal to 70% and less than or equal to 99%, greater than or equal to 70% and less than or equal to 95%, greater than or equal to 80% and less than or equal to 99%, or even greater than or equal to 80% and less than or equal to 95%, or any and all sub-ranges formed from any of these endpoints.

In embodiments, each of the plurality of polyhedral surface features 106 may comprise a dendritic structure extending from the base 108 of the polyhedral surface feature 106. Dendritic features alone may not provide high reflectively. However, when formed in combination with the polyhedral surface features 106, the desired highly reflective appearance may be achieved.

The structure of each polyhedral surface feature 106, which includes flat, converging facets 110 and are approximately straight along the relatively large bases 108, reflects light in different directions to achieve the "glowing" (i.e., highly reflective) appearance. The "glowing" appearance of the textured glass article may be evidenced by a relatively greater 450 nm reflectance, peak GU, FWHM, range of GU values, skewness, and excess kurtosis as compared to a textured glass article that lacks polyhedral surface features.

A relatively greater 450 nm reflectance corresponds to more light being reflected from the flat, converging facets 110 of the polyhedral surface features 106. In embodiments, the textured glass article 100 may have a 450 nm reflectance greater than or equal to 5% or even greater than or equal to 10%. In embodiments, the textured glass article 100 may have a 450 nm reflectance less than or equal to 30% or even less than or equal to 25%. In embodiments, the textured glass article may have a 450 nm reflectance greater than or equal to 5% and less than or equal to 30%, greater than or equal to 5% and less than or equal to 25%, greater than or equal to 10% and less than or equal to 30%, or even greater than or equal to 10% and less than or equal to 25%, or any and all sub-ranges formed from any of these endpoints.

A relatively higher peak GU within the GU distribution corresponds to more light being reflected from the flat, converging facets 110 of the polyhedral surface features 106. In embodiments, the textured glass article 100 may have a peak GU greater than or equal to 50 GU, greater than or equal to 60 GU, greater than or equal to 70 GU, or even greater than or equal to 80 GU. In embodiments, the textured glass article 100 GU may have a peak GU less than or equal to 150 GU, less than or equal to 125 GU, less than or equal to 115 GU, or even less than or equal to 100 GU. In embodiments, the textured glass article may have a peak GU greater than or equal to 50 GU and less than or equal to 150 GU, greater than or equal to 50 GU and less than or equal to 125 GU, greater than greater than or equal to 50 GU and less than or equal to 115 GU, greater than or equal to 50 GU and less than or equal to 100 GU, greater than or equal to 60 GU and less than or equal to 150 GU, greater than or equal to 60 GU and less than or equal to 125 GU, greater than greater than or equal to 60 GU and less than or equal to 115 GU, greater than or equal to 60 GU and less than or equal to 100 GU, greater than or equal to 70 GU and less than or equal to 150 GU, greater than or equal to 70 GU and less than or equal to 125 GU, greater than greater than or equal to 70 GU and less than or equal to 115 GU, greater than or equal to 70 GU and less than or equal to 100 GU, greater than or equal to 80 GU and less than or equal to 150 GU, greater than or equal to 80 GU and less than or equal to 125 GU, greater than greater than or equal to 80 GU and less than or equal to 115 GU, or even greater than or equal to 80 GU and less than or equal to 100 GU, or any and all sub-ranges formed from any of these endpoints.

A relatively greater FWHM and range of GU values correspond to a wider distribution of grayscale values, which increase with surface feature size.

In embodiments, the textured glass article 100 may have a FWHM greater than or equal to 10 GU or even greater than or equal to 25 GU. In embodiments, the textured glass article 100 may have a FWHM less than or equal to 75 GU or even less than or equal to 60 GU. In embodiments, the textured glass article 100 may have a FWHM greater than or equal to 10 GU and less than or equal to 75 GU, greater than or equal to 10 GU and less than or equal to 60 GU, greater than or equal to 25 GU and less than or equal to 75 GU, or even greater than or equal to 25 GU and less than or equal to 60 GU, or any and all sub-ranges formed from any of these endpoints.

In embodiments, the textured glass article 100 may have a range of GU values greater than or equal to 100 GU or even greater than or equal to 125 GU. In embodiments, the textured glass article 100 may have a range of GU values less than or equal to 300 GU or even less than or equal to 250 GU. In embodiments, the textured glass article 100 may have a range of GU values greater than or equal to 100 GU and less than or equal to 300 GU, greater than or equal to 100 GU and less than or equal to 250 GU, greater than or equal to 125 GU and less than or equal to 300 GU, or even greater than or equal to 125 GU and less than or equal to 250 GU, or any and all sub-ranges formed from any of these endpoints.

Skewness describes the asymmetry of a grayscale distribution. A relatively greater skewness corresponds to greater positive ("right-handed") asymmetry about the mean grayscale value, which is indicative of a greater amount of high intensity contributions (e.g., outside upper limit of 75% interquartile range) to the distribution of light reflected from the flat, converging facets 110 of the polyhedral surface features 106. In embodiments, the textured glass article may have a skewness greater than or equal to 0.05 or even greater than or equal to 0.1. In embodiments, the textured glass article 100 may have a skewness less than or equal to 0.7 or even less than or equal to 0.5. In embodiments, the textured glass article 100 may have a skewness greater than or equal to 0.05 and less than or equal to 0.7, greater than or equal to 0.05 and less than or equal to 0.5, greater than or equal to 0.1 and less than or equal to 0.7, or even greater than or equal to 0.1 and less than or equal to 0.5, or any and all sub-ranges formed from any of these endpoints.

Kurtosis provides a measure of the outliers in a grayscale distribution. The more "heavy-tailed" a distribution is, the more outliers are present. Excess kurtosis, which is the kurtosis minus three, is used to make the comparison to a normal distribution easier since the kurtosis of an ideal normal distribution is three. By subtracting three, the kurtosis of an idealized normal distribution is thus shifted to zero and any additional kurtosis in the sample distribution is referred to as excess kurtosis. A relatively greater excess kurtosis indicates that there is a significant amount of high intensity grayscale value outliers (e.g., outside upper limit of 75% interquartile range), corresponding to a greater amount of high intensity contributions to the distribution of light reflected from the flat, converging facets 110 of the polyhedral surface features 106. In embodiments, the textured glass article 100 may have an excess kurtosis greater than or equal to 0.5 or even greater than or equal to 0.75. In embodiments, the textured glass article 100 may have an excess kurtosis less than or equal to 3 or even less than or equal to 2. In embodiments, the textured glass article 100 may have an excess kurtosis greater than or equal to 0.5 and less than or equal to 3, greater than or equal to 0.5 and less than or equal to 2, greater than or equal to 0.75 and less than or equal to 3, or even greater than or equal to 0.75 and less than or equal to 2, or any and all sub-ranges formed from any of these endpoints.

Dendritic Surface Features

Figure 3:
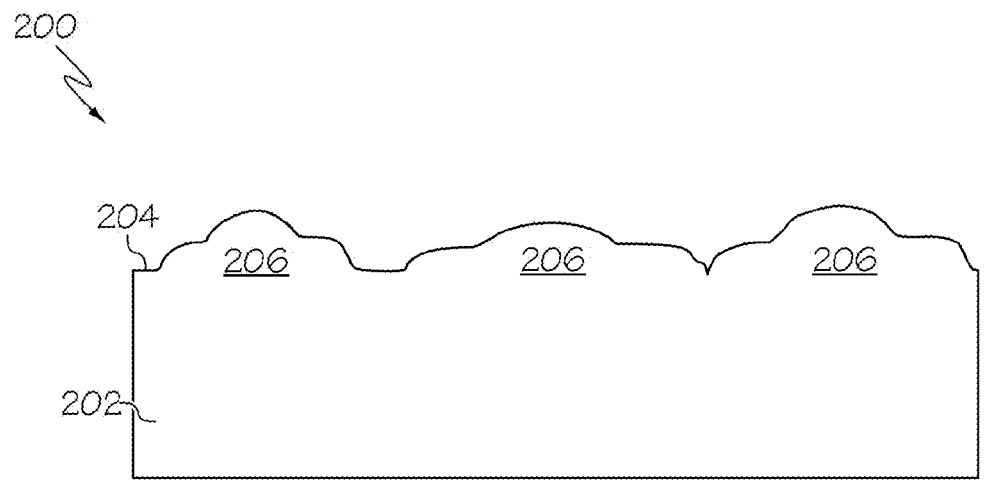
FIG. 3 schematically depicts a perspective view of a textured glass article, according to one or more embodiments shown and described herein.
Figure 4:
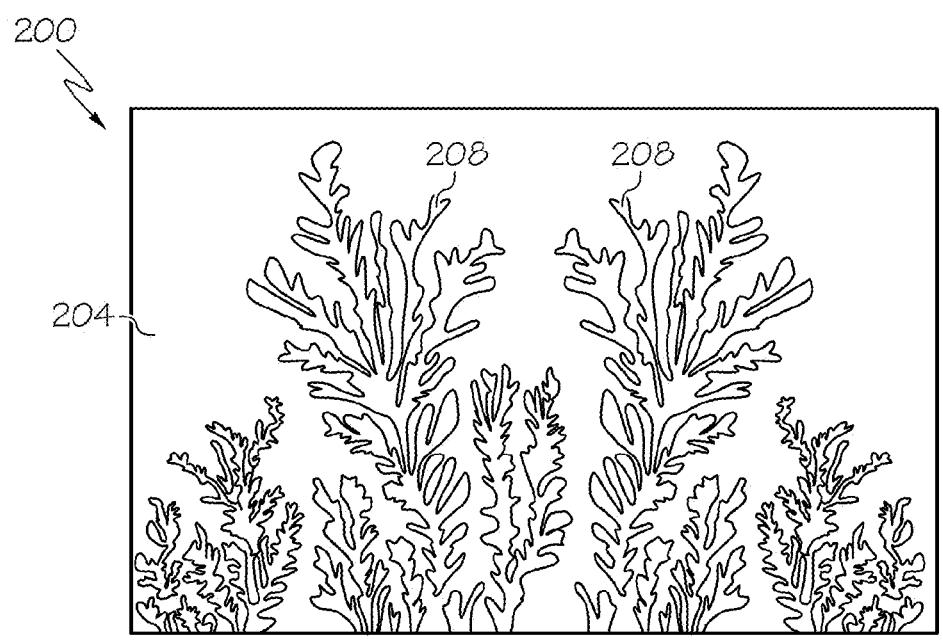
FIG. 4 schematically depicts a plan view, respectively, of a textured glass article, according to one or more embodiments shown and described herein.

Referring now to FIGS. 3 and 4, in other embodiments, the textured glass articles 200 described herein have a body 202 including an aluminosilicate glass comprising greater than or equal to 16 wt % $Al_2O_3$ and a $Al_2O_3/SiO_2$ ratio greater than 0.3. In embodiments, the aluminosilicate glass article may comprise greater than or equal to 52 wt % and less than or equal to 62 wt % $SiO_2$; greater than or equal to 16 wt % and less than or equal to 28 wt % $Al_2O_3$; greater than or equal to 0 wt % and less than or equal to 5 wt % $B_2O_3$; greater than or equal to 8 wt % and less than or equal to 13 wt % $Na_2O$; greater than or equal to 0 wt % and less than or equal to 0.2 wt % $K_2O$; greater than or equal to 0 wt % and less than or equal to 4 wt % $Li_2O$; and greater than or equal to 0 wt % and less than or equal to 1.5 wt % MgO. However, it should be understood that other aluminosilicate glasses are contemplated and possible, so long as the aluminosilicate glass has greater than or equal to 16 wt % $Al_2O_3$ and a $Al_2O_3/SiO_2$ ratio greater than 0.3.

The body 202 includes at least a first surface 204. A plurality of dendritic surface features 206 extend from the first surface 204. Each dendritic surface feature 206 includes a base 208 on the first surface 204.

In embodiments, a surface feature size at the base 208 is greater than or equal to 100 µm and less than or equal to 350 µm. In embodiments, the surface feature size at the base 208 may be greater than or equal to 100 µm, greater than or equal to 125 µm, or even greater than or equal to 150 µm. In embodiments, the surface feature size at the base 208 may be less than or equal to 350 µm, less than or equal to 250, or even less than or equal to 200 µm. In embodiments, the surface feature size at the base 208 may be greater than or equal to 100 µm and less than or equal to 350 µm, greater than or equal to 100 µm and less than or equal to 250 µm, greater than or equal to 100 µm and less than or equal to 200 µm, greater than or equal to 125 µm and less than or equal to 350 µm, greater than or equal to 125 µm and less than or equal to 250 µm, greater than or equal to 125 µm and less than or equal to 200 µm, greater than or equal to 150 µm and less than or equal to 350 µm, greater than or equal to 150 µm and less than or equal to 250 µm, or even greater than or equal to 150 µm and less than or equal to 200 µm, or any and all sub-ranges formed from any of these endpoints.

The structure of each dendritic surface feature 206 aids in achieving the desired enhanced tactile impression.

In embodiments, the textured glass article 200 may have a surface roughness Ra greater than or equal to 2 µm. In embodiments, the textured glass article 200 may have a surface roughness Ra less than or equal to 4 µm or even less than or equal to 3 µm. In embodiments, the textured glass article 200 may have a surface roughness Ra greater than or equal to 2 µm and less than or equal to 4 µm or even greater than or equal to 2 µm and less than or equal to 3 µm, or any and all sub-ranges formed from any of these endpoints.

The transmittance haze of the textured glass article 200 may be correlated to the surface roughness Ra in that a relatively greater transmittance haze may imply that the textured glass article 200 has a relatively greater surface roughness Ra. In embodiments, the textured glass article 200 may have a transmittance haze greater than or equal to 50%, greater than or equal to 60%, or even greater than or equal to 70%. In embodiments, the textured glass article 200 may have a transmittance haze less than or equal to 98%, less than or equal to 95%, or even less than or equal to 90%. In embodiments, the textured glass article 200 may have a transmittance haze greater than or equal to 50% and less than or equal to 98%, greater than or equal to 50% and less than or equal to 95%, greater than or equal to 50% and less than or equal to 90%, greater than or equal to 60% and less than or equal to 98%, greater than or equal to 60% and less than or equal to 95%, greater than or equal to 60% and less than or equal to 90%, greater than or equal to 70% and less than or equal to 98%, greater than or equal to 70% and less than or equal to 95%, or even greater than or equal to 70% and less than or equal to 90%, or any and all sub-ranges formed from any of these endpoints.

A relatively high transmission of the textured glass article 200 allows for ink to be placed on the back of the textured glass article 200 (i.e., opposite the textured side) to provide a different color or pattern or to include text (e.g., company brand). In embodiments, the textured glass article 200 may have a transmission greater than or equal to 75% or even greater than or equal to 85%. In embodiments, the textured glass article 200 may have a transmission less than or equal to 99% or even less than or equal to 97%. In embodiments, the textured glass article 200 may have a transmission greater than or equal to 75% and less than or equal to 99%, greater than or equal to 75% and less than or equal to 97%, 85% and less than or equal to 99%, or even greater than or equal to 85% and less than or equal to 97%, or any and all sub-ranges formed from any of these endpoints.

In embodiments, the textured glass article 200 may have a 450 nm reflectance greater than or equal to 1% or even greater than or equal to 5%. In embodiments, the textured glass article 100 may have a 450 nm reflectance less than or equal to 20% or even less than or equal to 15%. In embodiments, the textured glass article 200 may have a 450 nm reflectance greater than or equal to 1% and less than or equal to 20%, greater than or equal to 1% and less than or equal to 15%, greater than or equal to 5% and less than or equal to 20%, or even greater than or equal to 5% and less than or equal to 15%, or any and all sub-ranges formed from any of these endpoints.

In embodiments, each of the plurality of dendritic surface features 206 may comprise a polyhedral structure extending from base 208 of the dendritic surface feature 206 and away from the first surface 204. Polyhedral surface features alone may not provide enhanced tactile impression. However, when formed in combination with the dendritic surface features 206, the desired enhanced tactile impression may be achieved.

Method of Forming Textured Glass Article

Figure 5:
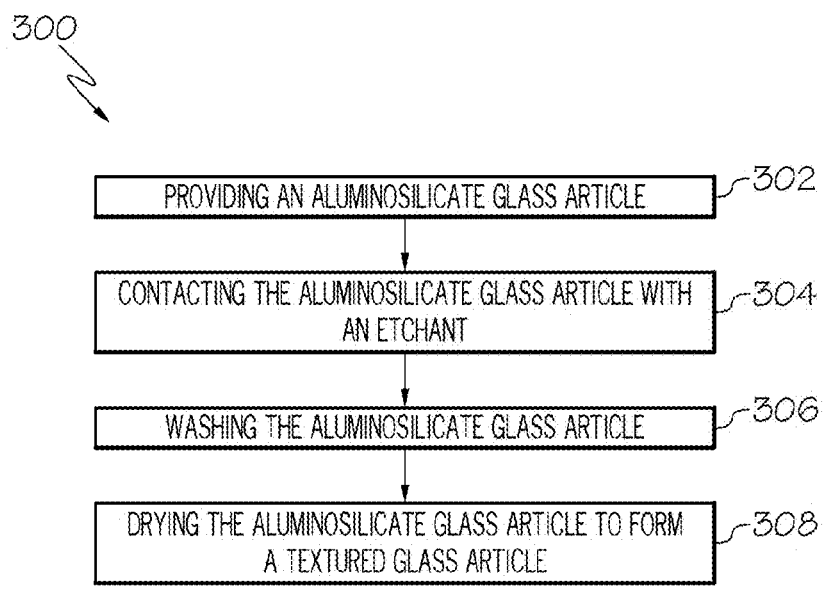
FIG. 5 is a flow diagram of method of forming a textured glass article according to one or more embodiments described herein.
Figure 6:
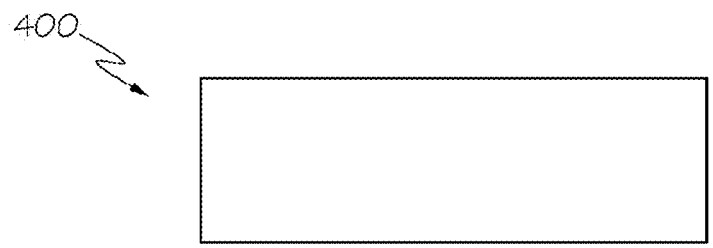
FIG. 6 schematically depicts a step of an etching process, according to one or more embodiments shown and described herein.

Referring now to FIG. 5, a method of forming a textured glass article by a chemical etching process is shown at 300. At block 302 and as shown in FIG. 6, an aluminosilicate glass article 400 comprising greater than or equal to 16 wt % $Al_2O_3$ is initially provided. In embodiments where polyhedral surface features are desired to produce a highly reflective appearance, the aluminosilicate glass article 400 may be an aluminosilicate glass article comprising greater than or equal to 16 wt % $Al_2O_3$ and having a $Al_2O_3/SiO_2$ ratio less than or equal to 0.3 as described with reference to aluminosilicate glass article 100 herein. In embodiments where dendritic surface features are desired to produce an enhanced tactile impression, the aluminosilicate glass article 400 may be an aluminosilicate glass article comprising greater than or equal to 16 wt % $Al_2O_3$ and having a $Al_2O_3/SiO_2$ ratio greater than 0.3 as described with reference to aluminosilicate glass article 200 herein.

The aluminosilicate glass article 400 may be in the form of a plate with a first surface and a second surface opposite and generally parallel to the first surface. In embodiments, the aluminosilicate glass article 400 may be pre-cleaned with a cleaning solution including potassium hydroxide, hydrofluoric acid, hydrochloric acid, or combinations thereof.

Figure 7:
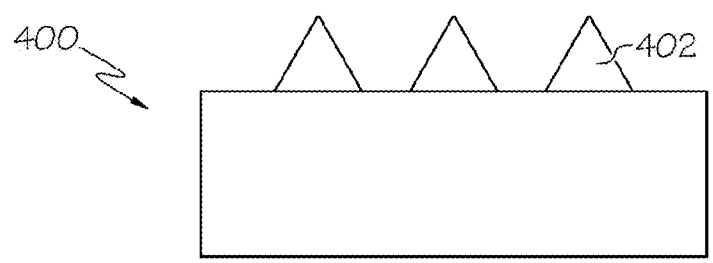
FIG. 7 schematically depicts another step of the etching process, according to one or more embodiments shown and described herein.

Referring back to FIG. 5 at block 304 and as shown in FIG. 7, the aluminosilicate glass article 400 is contacted with an etchant. The etchant reacts with the aluminosilicate glass article 400, which causes silicate and/or aluminate species to be released from aluminosilicate glass article 400. The silicate and/or aluminate species combine with elements of the etchant to produce precipitates. If these precipitates have a low solubility in the etchant, then they deposit on the surface of the aluminosilicate glass article 400 to form crystal seeds 402 (e.g., salt crusts).

Figure 8:
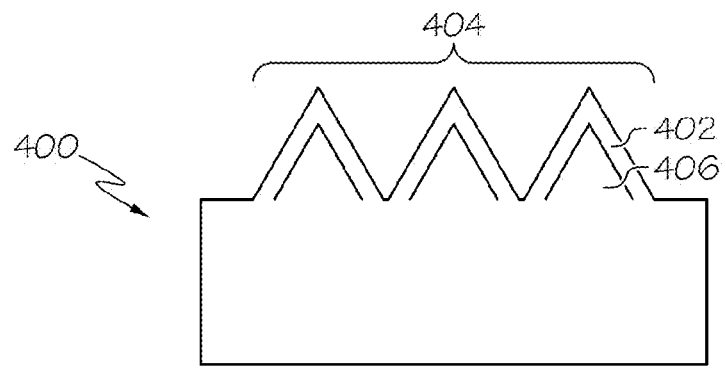
FIG. 8 schematically depicts another step of the etching process, according to one or more embodiments shown and described herein.

As shown in FIG. 8, as the etchant continues to react with the aluminosilicate glass article 400, the crystal seeds 402 grow. Because the crystal seeds 402 are insoluble in the etchant, the crystal seeds 402 serve as in-situ mask 404. The mask 404 seals portions of the surface of the aluminosilicate glass article 400. Glass is etched away around the mask 404 to generate surface features 406. The shape of the surface features 406 may be determined by the shape of the mask 404, which may be altered by varying the composition of the etchant and/or varying the length of time the etchant contacts the aluminosilicate glass article 400.

Figure 9:
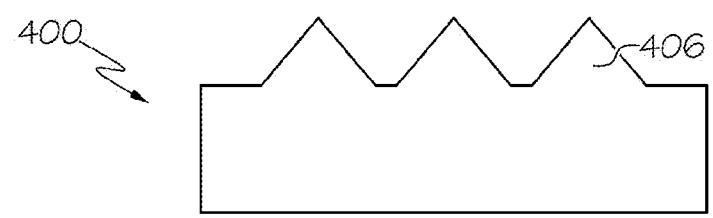
FIG. 9 schematically depicts another step of the etching process, according to one or more embodiments shown and described herein.

Referring back to FIG. 5 at block 306 and as shown in FIG. 9, the aluminosilicate glass article 400 is washed to remove the etchant and crystal seeds 402 from the surface and then dried to form the textured glass article 410 having surface features 406. In embodiments, the etchant is rinsed off of the aluminosilicate glass article 400 with deionized (DI) water. In embodiments, crystal seeds 402 adhering to the aluminosilicate glass article 400 may be removed by, for example, a scrubber sponge. Referring back to FIG. 6 at block 308, in embodiments, the aluminosilicate glass article 400 is dried in ambient condition. Alternatively, the aluminosilicate glass article may be 400 heated to dry the glass article.

Although the surface features 406 shown in FIGS. 8 and 9 are polyhedral surface features, it should be appreciated that the method described herein may be similarly used to produce dendritic surface features.

To produce the polyhedral surface features, the aluminosilicate glass article comprising greater than or equal to 16 wt % $Al_2O_3$ may have a $Al_2O_3/SiO_2$ ratio less than or equal to 0.3 such that the etchant described herein having a pH less than 3 preferentially generates a silicon-based precipitate and minimizes the aluminum-based precipitate. Silicon-based precipitates (e.g., metal fluorosilicate ($MSiF_6$)) lead to polyhedral surface features, which may result in a highly reflective appearance.

To produce the dendritic surface features, the aluminosilicate glass article comprising greater than or equal to 16 wt % $Al_2O_3$ may have a $Al_2O_3/SiO_2$ ratio greater than 0.3 such that the etchant described herein having a pH less than 3 preferentially generates an aluminum-based precipitate and minimizes the silicon-based precipitate. Aluminum-based precipitates (e.g., metal aluminofluoride ($MAlF_5$)) lead to small, dendritic surface features, which may result in enhance tactile impression.

Accordingly, in embodiments, the etchants described herein have a pH less than or equal to 3.0. In embodiments, the etchants may have a pH less than or equal to 3.0, less than or equal to 2.8, or even less than or equal to 2.6.

In embodiments, the etchant may comprise a salt and an acid, as described in further detail herein.

The salt present in the etchant acts as a crystallization promoter encouraging the formation of crystal seeds. In embodiments, the salt may comprise ammonium chloride, ammonium fluoride, ammonium bifluoride, ammonium sulfate, ammonium nitrate, potassium sulfate, potassium chloride, potassium fluoride, potassium bifluoride, potassium nitrate, sodium chloride, sodium fluoride, sodium bifluoride, or combinations. The amount of the salt in the etchant should be sufficiently high (e.g., greater than or equal to 20 wt %) to ensure the formation of the crystal seeds. The amount of salt may be limited (e.g., less than or equal to 40 wt %) to reduce or prevent undissolved salt that may precipitate out once solubility is reached. Undissolved salt may etch differently than the etchant and may cause a lack of uniformity across the textured glass surface. In embodiments, the etchant may comprise greater than or equal to 20 wt % and less than or equal to 40 wt % of the salt. In embodiments, the amount of the salt in the etchant may be greater than or equal to 20 wt %, greater than or equal to 24 wt %, or even greater than or equal to 28 wt %. In embodiments, the amount of the salt in the etchant may be less than or equal to 40 wt %, less than or equal to 36 wt %, or even less than or equal to 32 wt %. In embodiments, the amount of the salt in the etchant may be greater than or equal to 20 wt % and less than or equal to 40 wt %, greater than or equal to 20 wt % and less than or equal to 36 wt %, greater than or equal to 20 wt % and less than or equal to 32 wt %, greater than or equal to 24 wt % and less than or equal to 40 wt %, greater than or equal to 24 wt % and less than or equal to 36 wt %, greater than or equal to 24 wt % and less than or equal to 32 wt %, greater than or equal to 28 wt % and less than or equal to 40 wt %, greater than or equal to 28 wt % and less than or equal to 36 wt %, or even greater than or equal to 28 wt % and less than or equal to 32 wt %, or any and all sub-ranges formed from any of these endpoints.

The acid present in the etchant functions to dissolve the components of the glass network of the aluminosilicate glass article and form the surface features. In embodiments, the acid may comprise hydrochloric acid, hydrofluoric acid, nitric acid, sulfuric acid, oxalic acid, acetic acid, bisulfate salt (e.g., sodium bisulfate) or combinations thereof. The amount of the acid in the etchant should be sufficiently high (e.g., greater than or equal to 30 wt %) to ensure etching of glass and the formation of the textured glass article The amount of acid may be limited (e.g., less than or equal to 65 wt %) to ensure the surface features are produced. When an excessive amount of acid is added, the surface features may be corroded to a smaller size, losing their highly reflective appearance and/or enhanced tactile impression. In embodiments, the etchant may comprise greater than or equal to 30 wt % and less than or equal to 65 wt % of the acid. In embodiments, the amount of the acid in the etchant may be greater than or equal to 30 wt %, greater than or equal to 35 wt %, or even greater than or equal to 40 wt %. In embodiments, the amount of the acid in the etchant may be less than or equal to 65 wt %, less than or equal to 55 wt %, or even less than or equal to 45 wt %. In embodiments, the amount of the acid in the etchant may be greater than or equal to 30 wt % and less than or equal to 65 wt %, greater than or equal to 30 wt % and less than or equal to 55 wt %, greater than or equal to 30 wt % and less than or equal to 45 wt %, greater than or equal to 35 wt % and less than or equal to 65 wt %, greater than or equal to 35 wt % and less than or equal to 55 wt %, greater than or equal to 35 wt % and less than or equal to 45 wt %, greater than or equal to 40 wt % and less than or equal to 65 wt %, greater than or equal to 40 wt % and less than or equal to 55 wt %, or even greater than or equal to 40 wt % and less than or equal to 45 wt %, or any and all sub-ranges formed from any of these endpoints.

In embodiments, the etchant may further include a solvent. In embodiments, the solvent may comprise water, an acid (e.g., hydrochloric acid and/or hydrofluoric acid), or combinations thereof. In embodiments, the etchant may comprise greater than or equal to 20 wt % and less than or equal to 40 wt % of the solvent. In embodiments, the amount of the solvent in the etchant may be greater than or equal to 20 wt % or even greater than or equal to 25 wt %. In embodiments, the amount of the solvent in the etchant may be less than or equal to 40 wt % or even less than or equal to 35 wt %. In embodiments, the amount of the solvent in the etchant may be greater than or equal to 20 wt % and less than or equal to 40 wt %, greater than or equal to 20 wt % and less than or equal to 35 wt %, greater than or equal to 25 wt % and less than or equal to 40 wt %, or even greater than or equal to 25 wt % and less than or equal to 35 wt %, or any and all sub-ranges formed from any of these endpoints.

In embodiments, the etchant is prepared by mixing the components and stirring for at least 12 hours (i.e., aging). After stirring, the supernatant is decanted and used as the etchant.

In embodiments, the etchant may comprise greater than or equal to 20 wt % and less than or equal to 40 wt % ammonium fluoride; greater than or equal to 25 wt % and less than or equal to 45 wt % nitric acid; greater than or equal to 5 wt % and less than or equal to 20 wt % hydrofluoric acid; and greater than or equal to 20 wt % and less than or equal to 40 wt % water.

Figure 10:
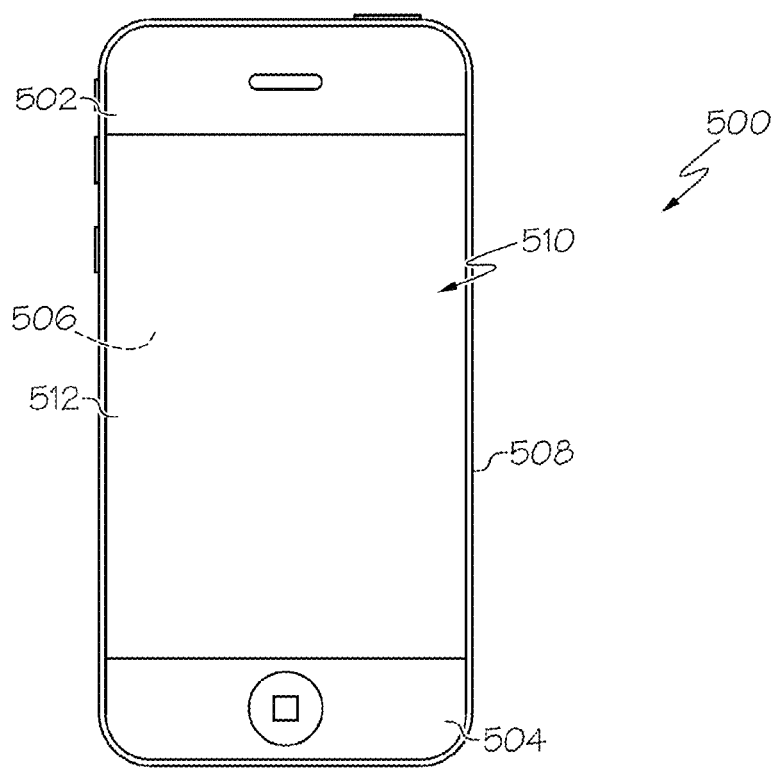
FIG. 10 is a plan view of an exemplary electronic device incorporating any of the textured glass articles, according to one or more embodiments shown and described herein.
Figure 11:
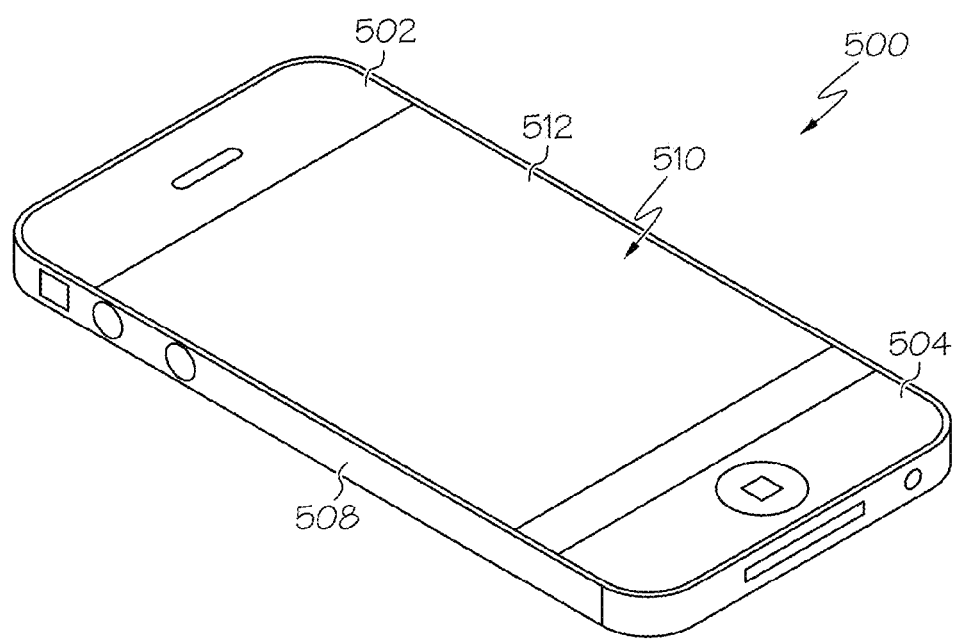
FIG. 11 is a perspective view of the exemplary electronic device of FIG. 10.
Figure 12:
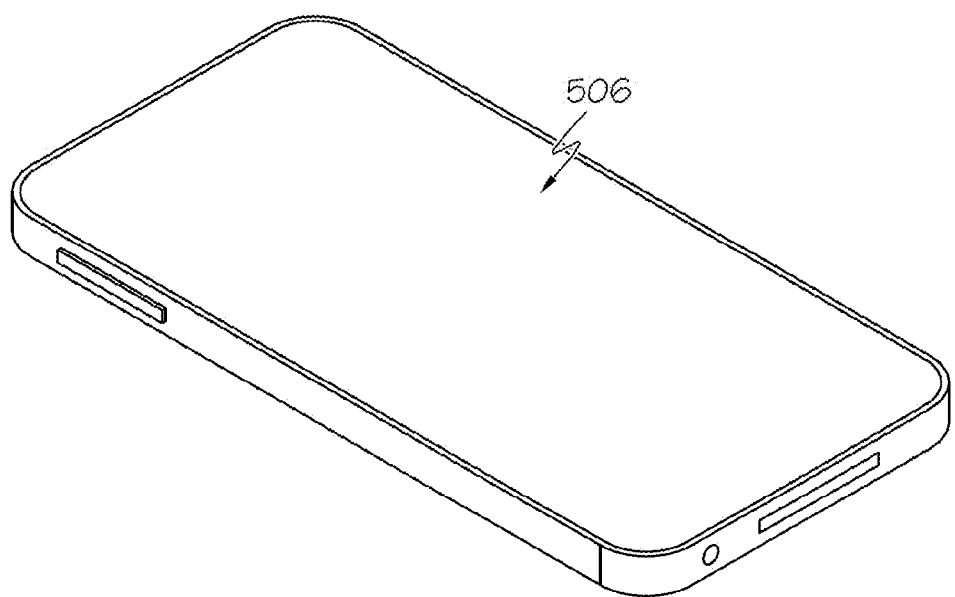
FIG. 12 is a perspective view of the exemplary electronic device of FIG. 10.

The textured glass articles described herein may be used for a variety of applications including, for example, back cover applications in consumer or commercial electronic devices such as smartphones, tablet computers, personal computers, ultrabooks, televisions, and cameras. An exemplary article incorporating any of the textured glass articles disclosed herein is shown in FIGS. 10-12. Specifically, FIGS. 10-12 show a consumer electronic device 500 including a housing 502 having front 504, back 506, and side surfaces 508; electrical components (not shown) that are at least partially inside or entirely within the housing and including at least a controller, a memory, and a display 510 at or adjacent to the front surface of the housing; and a cover substrate 512 at or over the front surface of the housing such that it is over the display. In embodiments, a portion of housing 502, such as the back 506, may include any of the textured glass articles disclosed herein.

EXAMPLES

In order that various embodiments be more readily understood, reference is made to the following examples, which illustrate various embodiments of the textured glass articles described herein.

Glass articles having Glass Compositions 1 and 2 as shown in Table 1 were treated as described below.

The compositions of Glass Articles 1 and 2 treated as described below are shown in Table 1. Note that reference to "Glass Article 1" and "Glass Article 2" refers to a glass article that has the respective composition shown in Table 1. References to Glass Articles 1 and 2 do not refer to the same Glass Articles 1 and 2, respectively, that were treated multiple times with the various etchants.

TABLE 1

| Glass Article | 1 | 2 |
|---|---|---|
| SiO$_2$ (wt %) | 56.54 | 61.81 |
| Al$_2$O$_3$ (wt %) | 23.89 | 19.73 |
| B$_2$O$_3$ (wt %) | — | 3.93 |
| Na$_2$O (wt %) | 9.94 | 12.85 |
| K$_2$O (wt %) | — | — |
| Li$_2$O (wt %) | 2.73 | — |

TABLE 2

| Etchant | Example Etchant 1 |
|---|---|
| HNO$_3$ (wt %) | 33 |
| HF (wt %) | 10 |
| NH$_4$F (wt %) | 30 |
| H$_2$O (wt %) | 27 |
| pH | 2.6 |

TABLE 3

| Textured Glass | CG$_A$ | EG$_A$ | EG$_B$ | EG$_C$ |
|---|---|---|---|---|
| Glass Article | 2 | 2 | 2 | 2 |
| Etchant | — | Example Etchant 1 | Example Etchant 1 | Example Etchant 1 |
| Treatment Time (min) | — | 2 | 4 | 8 |
| Surface Feature Size (μm) | 0 | 87 ± 20 | 90 ± 17 | 81 ± 16 |
| Surface Roughness (μm) | 0 | 1.6 ± 0.3 | 1.6 ± 0.2 | 1.9 ± 0.2 |
| Transmittance Haze (%) | 0 | 92.9 ± 0.3 | 96.2 ± 0.5 | 89.04 ± 0.02 |
| Transmission (%) | 96.74 ± 0.03 | 91.9 ± 0.2 | 89.98 ± 0.09 | 90.66 ± 0.07 |
| 450 nm Reflectance (%) | 7.91 ± 0.01 | 15.2 ± 0.4 | 18.4 ± 0.2 | 20.4 ± 0.7 |

| Textured Glass | CG$_B$ | EG$_D$ | EG$_E$ |
|---|---|---|---|
| Glass Article | 1 | 1 | 1 |
| Etchant | — | Example Etchant 1 | Example Etchant 1 |
| Treatment Time (min) | — | 4 | 4 |
| Surface Feature Size (μm) | 0 | 172 ± 43 | 187 ± 48 |
| Surface Roughness (μm) | 0 | 2.2 ± 0.5 | 2.2 ± 0.3 |
| Transmittance Haze (%) | 0 | 85.7 ± 0.9 | 83.77 ± 0.04 |
| Transmission (%) | 96.80 ± 0.01 | 95.69 ± 0.07 | 95.61 ± 0.02 |
| 450 nm Reflectance (%) | 8.02 ± 0.01 | 9.21 ± 0.07 | 8.13 ± 0.02 |

TABLE 1-continued

| Glass Article | 1 | 2 |
|---|---|---|
| MgO (wt %) | — | 1.47 |
| ZnO (wt %) | 1.40 | — |
| P$_2$O$_5$ (wt %) | 5.18 | — |
| SnO$_2$ (wt %) | 0.10 | 0.21 |
| TiO$_2$ (wt %) | — | — |
| Fe$_2$O$_3$ (wt %) | — | 0.02 |
| Al$_2$O$_3$/SiO$_2$ | 0.4 | 0.3 |

Table 2 shows the composition of ammonium salt Example Etchant 1. Table 3 shows the respective treatment times and respective properties of the resultant textured glass articles. Comparative Textured Glass Articles CG$_A$ and CG$_B$ were formed from Glass Articles 1 and 2, respectively. Example Textured Glass Articles EG$_A$-EG$_E$ were formed by treating Glass Articles 1 and 2 with Example Etchant 1. The glass articles were 50 mm×50 mm×1.1 mm slides. Prior to treatment with the respective ammonium etchant, the glass articles were pre-cleaned using 4 wt % SemiClean KG detergent (produced by Yokohama Oils and Fats Industry Co., Ltd.) at 60° C. with sonication for 2 minutes, rinsed with DI water, and dried in a desiccator. The glass articles, except for the glass article used to form Example Textured Glass Article EG$_B$, were pre-etched with 10 vol % HF/20 vol % HCl for 2 minutes at 22° C., rinsed with DI water, shook to remove excess, and transferred to the respective etchant. The glass articles were treated with the respective etchant by vertically dipping and holding the glass article in the etchant for the period of time shown in Table 3. The glass articles were then removed from the etchant, rinsed with DI water, and dried at 110° C.

Etchant 1 was prepared by mixing 33 wt % nitric acid, 10 wt % hydrofluoric acid, 30 wt % ammonium fluoride, and 27 wt % water. After stirring for 12 hours, the supernatant was decanted in a polyethylene vial for treatment of Glass Articles 1 and 2.

Figure 13:
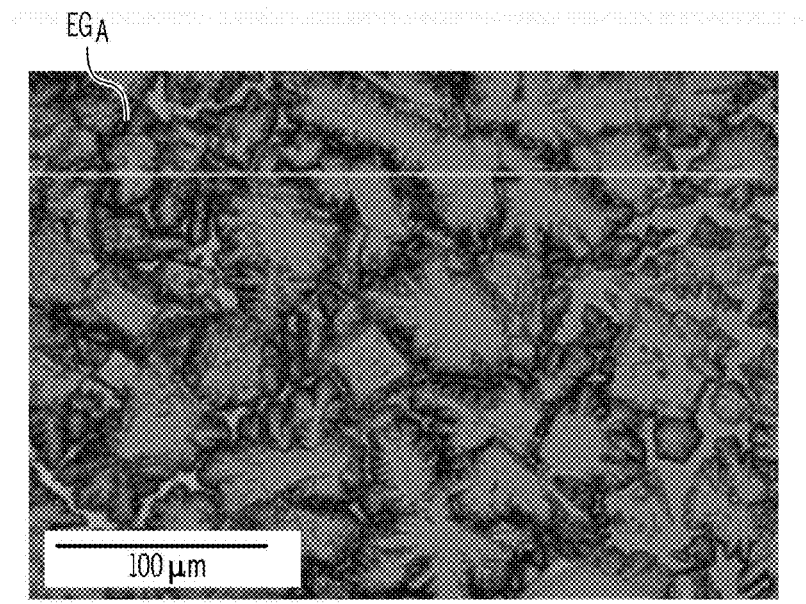
FIG. 13 is a confocal image with a magnification of 50× of a textured glass article, according to one or more embodiments shown and described herein.
Figure 14:
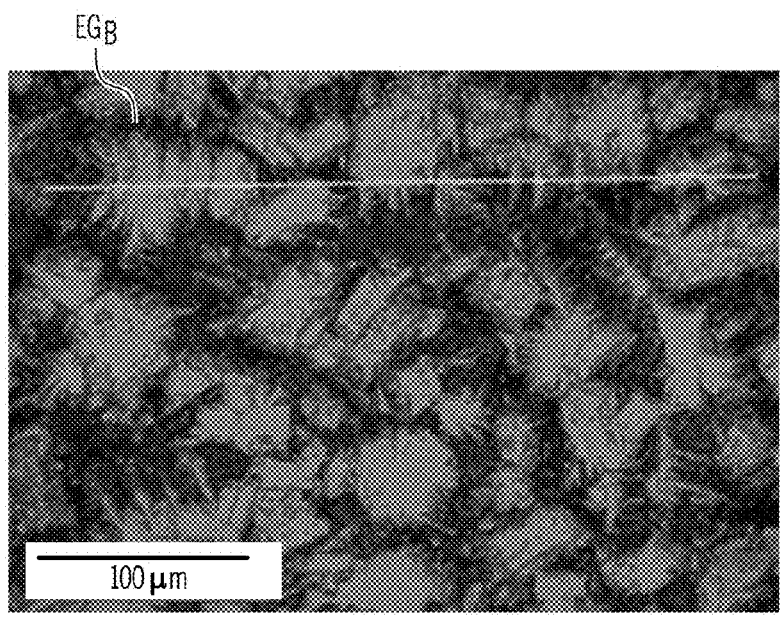
FIG. 14 is a confocal image with a magnification of 50× of a textured glass article, according to one or more embodiments shown and described herein.
Figure 15:
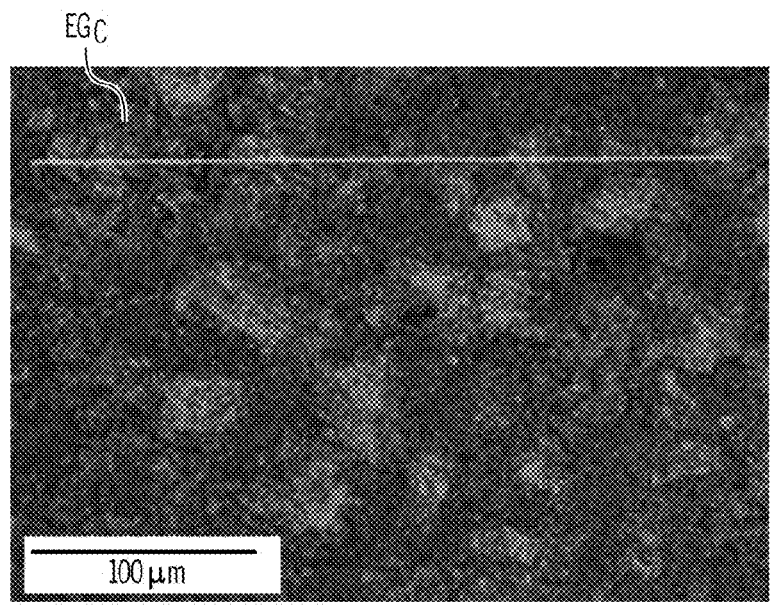
FIG. 15 is a confocal image with a magnification of 50× of a textured glass article, according to one or more embodiments shown and described herein.
Figure 16:
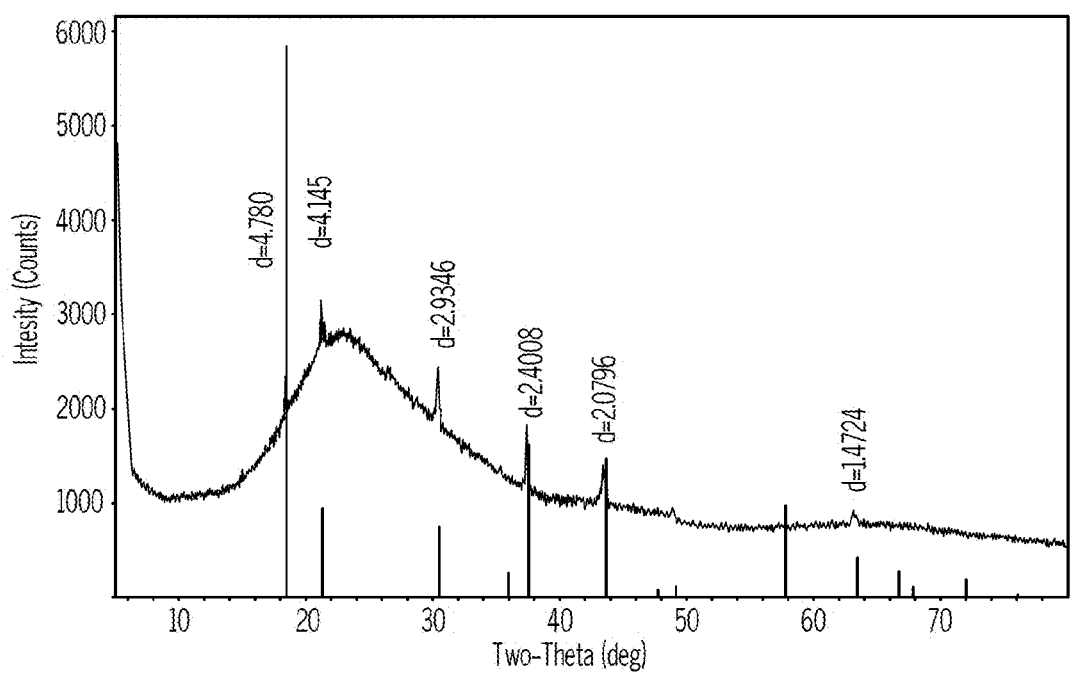
FIG. 16 is an XRD spectrum of a textured glass article, according to one or more embodiments shown and described herein.

Treating Glass Article 2 with Example Etchant 1 for 2, 4, and 8 minutes resulted in Example Textured Glass Articles EG$_A$, EG$_B$, and EG$_C$, respectively, the surfaces of which are shown in FIGS. 13-15. As shown, Example Textured Glass Articles EG$_A$, EG$_B$, and EG$_C$ had polyhedral crystal structures. Referring now to FIG. 16, the XRD spectrum of Example Textured Glass Article EG$_A$ included peaks indicating the presence of metal fluorosilicate-type precipitates (i.e., precipitates containing SiF$_6$, such as ammonium fluorosilicate) and did not include any peaks indicating the presence of aluminofluoride-type precipitates (i.e., precipitates containing Al). Accordingly, the resulting etchant precipitates of Example Textured Glass Articles EG$_A$, EG$_B$, and EG$_C$ included metal fluorosilicate-type precipitates and did not include any aluminofluoride-type precipitates. While not wishing to be bound by theory, the precipitation of only metalfluorosilicate-type precipitates resulted in the large, polyhedral structures.

The resulting surface features of Example Textured Glass Articles EG$_A$, EG$_B$, and EG$_C$ had a surface feature size of 87±20 μm, 90±17 μm, and 81±16 μm, respectively. Example Textured Glass Article EG$_A$ had a transmittance haze of 82.9±0.3%, a surface roughness of 1.6±0.3 μm, a transmission of 91.9±0.02%, and a 450 nm reflectance of 15.2±0.4%. Example Textured Glass Article EG$_B$ had a transmittance haze of 96.2±0.5%, a surface roughness of 1.6±0.2 μm, a transmission of 89.98±0.09%, and a 450 nm reflectance of 18.4±0.2%. Example Textured Glass Article EG$_C$ had a transmittance haze of 89.04±0.02%, a surface roughness of 1.9±0.2 µm, a transmission of 90.66±0.07%, and a 450 nm reflectance of 20.4±0.7%.

Figure 17:
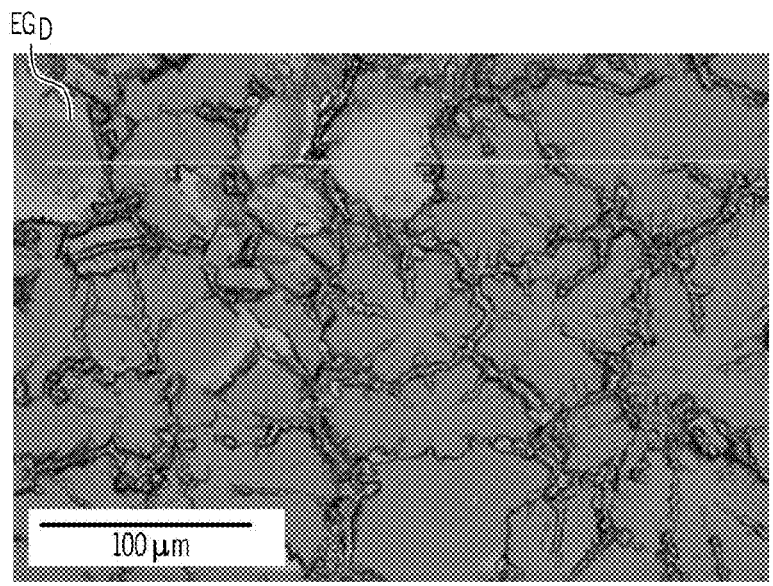
FIG. 17 is a confocal image with a magnification of 50× of a textured glass article, according to one or more embodiments shown and described herein.
Figure 18:
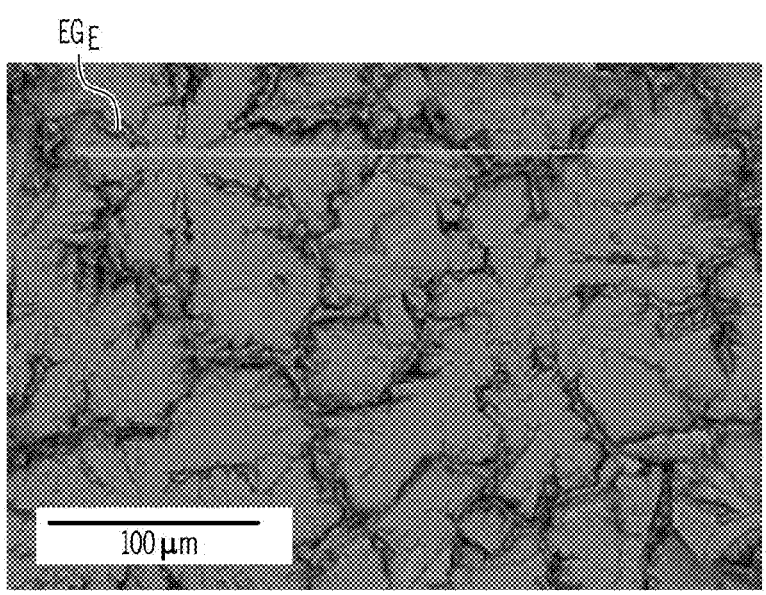
FIG. 18 is a confocal image with a magnification of 50× of a textured glass article, according to one or more embodiments shown and described herein.
Figure 19:
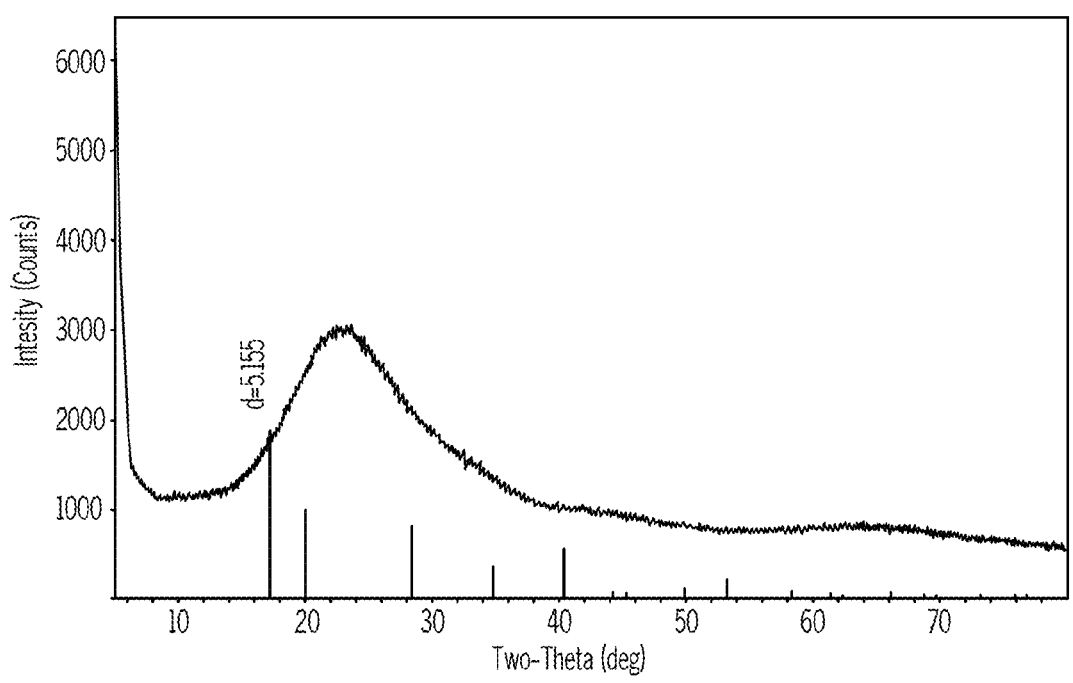
FIG. 19 is an XRD spectrum of a textured glass article, according to one or more embodiments shown and described herein.

Treating Glass Article 1 with Example Etchant 1 for 4 minutes resulted in Example Textured Glass Articles $EG_D$ and $EG_E$, respectively, the surfaces of which are shown in FIGS. 17 and 18, respectively. As shown, Example Textured Glass Articles $EG_D$ and $EG_E$ had dendritic crystal structures. Referring now to FIG. 19, the XRD spectrum of Example Textured Glass Article $EG_D$ included peaks indicating the presence of metal aluminofluoroide-type precipitates (i.e., precipitates containing Al, such as ammonium hexafluoro-aluminate) and did not include any peaks indicating the presence of fluorosilicate-type precipitates (i.e., precipitates containing $SiF_6$). Accordingly, the resulting etchant precipitates of Example Textured Glass Articles $EG_D$ and $EG_E$ included metal aluminofluroide-type precipitates and did not include any fluorosilicate-type precipitates. While not wishing to be bound by theory, the precipitation of only metal aluminofluoride-type precipitates resulted in the dendritic structures.

Example Textured Glass Article $EG_D$ had a transmittance haze of 85.7±0.9%, a surface roughness of 2.2±0.5 µm, a transmission of 86.74±0.03%, and a 450 nm reflectance of 7.91±0.01%. Example Textured Glass Article $EG_E$ had a transmittance haze of 83.77±0.04%, a surface roughness of 2.2±0.3 µm, a transmission of 95.61±0.02%, and a 450 nm reflectance of 8.13±0.02%.

As exemplified by FIGS. 12-19 and Tables 2 and 3, treating an aluminosilicate glass article comprising greater than or equal to 16 wt % $Al_2O_3$ and a $Al_2O_3/SiO_2$ ratio less than or equal to 0.3 with an etchant having a pH less than or equal to 3.0 results in the formation of polyhedral surface features and treating an aluminosilicate glass article comprising greater than or equal to 16 wt % $Al_2O_3$ and a $Al_2O_3/SiO_2$ ratio greater than 0.3 with an etchant having a pH less than or equal to 3.0 results in the formation of dendritic surface features.

Table 4 shows the respective grayscale distribution properties of Example Textured Glass Articles $EG_A$, $EG_B$, and $EG_C$.

TABLE 4

| Textured Glass | $EG_A$ | $EG_B$ | $EG_C$ |
| --- | --- | --- | --- |
| Peak GU (GU) | 58 | 90 | 110 |
| FWHM (GU) | 15 | 34 | 59 |
| Range of GU values (GU) | 128 | 180 | 242 |
| Skewness | 0.416 | 0.100 | 0.220 |
| Excess kurtosis | 0.787 | 0.896 | 1.45 |

The relatively higher peak GU of Example Textured Glass Articles $EG_A$, $EG_B$, and $EG_C$ indicated that more light was reflected from the surfaces of the example textured glass articles as compared to the comparative textured glass articles.

The relatively higher FWHM and range of GU values of Example Textured Glass Articles $EG_A$, $EG_B$, and $EG_C$ indicated that the polyhedral surface features of the example textured glass articles resulted in a relatively wider distribution of grayscale values.

The positive values showed that the "tails" on the right side of the Example Textured Glass Articles $EG_A$, $EG_B$, and $EG_C$ distributions were longer and, thus, had greater amount of high intensity contributions to the distribution of light the comparative textured glass articles.

The levels of excess kurtosis of Example Textured Glass Articles $EG_A$, $EG_B$, and $EG_C$ indicated that there is a significant amount of grayscale value outliers in the polyhedral surface structures of the example textured glass articles.

Referring back to Table 3, Example Textured Glass Articles Textured Glass Articles $EG_A$, $EG_B$, and $EG_C$ had a greater 450 nm reflectance than Comparative Textured Glass Article $CG_A$, and, thus, had more light being reflected off the surface of the glass article. While not wishing to be bound by theory, more light being reflect off the surface of the glass article resulted in a "glowing" (i.e., highly reflective) appearance.

As exemplified by Table 4, treating aluminosilicate glass articles comprising greater than or equal to 16 wt % $Al_2O_3$ and a $Al_2O_3/SiO_2$ ratio less than or equal to 0.3 results in the formation of polyhedral surface features that achieve a "glowing" (i.e., highly reflective) appearance as evidenced by relatively greater peak GU, FWHM, range of GU values, skewness, excess kurtosis, and 450 nm reflectance.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A textured glass article comprising:
   a body comprising an aluminosilicate glass comprising greater than or equal to 16 wt % $Al_2O_3$ and a $Al_2O_3/SiO_2$ ratio less than or equal to 0.3, the body having at least a first surface;
   a plurality of polyhedral surface features extending from the first surface, each of the plurality of polyhedral surface features comprising a base on the first surface and a plurality of facets extending from the first surface, wherein the plurality of facets of each polyhedral surface feature converge toward one another, wherein the plurality of polyhedral surface features comprises a surface feature size at the base greater than or equal to 50 µm and less than or equal to 100 µm; and
   a transmittance haze greater than or equal to 50%.

2. The textured glass article of claim 1, wherein the plurality of facets of each polyhedral surface feature converge toward one another to form at least one apex, the at least one apex being sharp, rounded, or truncated.

3. The textured glass article of claim 1, wherein the textured glass article has a surface roughness Ra greater than or equal to 1 µm.

4. The textured glass article of claim 1, wherein the base of each of the plurality of polyhedral surface features comprises at least three sides, at least one side converging toward at least another side.

5. The textured glass article of claim 1, wherein each of the plurality of polyhedral surface features comprises a dendritic structure extending from the base.

6. The textured glass article of claim 1, wherein the textured glass article has a location of peak maximum (peak GU) greater than or equal to 50 GU and less than or equal to 150 GU.

7. The textured glass article of claim 1, wherein the textured glass article has a full width at half maximum greater than or equal to 10 GU and less than or equal to 70 GU.

8. The textured glass article of claim 1, wherein the textured glass article has a range of GU values greater than or equal to 100 GU and less than or equal to 300 GU.

9. The textured glass article of claim 1, wherein the textured glass article has a skewness greater than or equal to 0.05 and less than or equal to 0.7.

10. The textured glass article of claim 1, wherein the textured glass article has an excess kurtosis greater than or equal to 0.5 and less than or equal to 3.

11. The textured glass article of claim 1, wherein the textured glass article comprises:
greater than or equal to 52 wt % and less than or equal to 67 wt % $SiO_2$;
greater than or equal to 16 wt % and less than or equal to 28 wt % $Al_2O_3$;
greater than or equal to 0 wt % and less than or equal to 5 wt % $B_2O_3$;
greater than or equal to 8 wt % and less than or equal to 15 wt % $Na_2O$;
greater than or equal to 0 wt % and less than or equal to 0.2 wt % $K_2O$;
greater than or equal to 0 wt % and less than or equal to 4 wt % $Li_2O$; and
greater than or equal to 0 wt % and less than or equal to 5 wt % MgO.

12. A textured glass article comprising:
a body comprising an aluminosilicate glass comprising greater than or equal to 16 wt % $Al_2O_3$ and a $Al_2O_3$/$SiO_2$ ratio greater than 0.3, the body having at least a first surface;
a plurality of dendritic surface features extending from the first surface, each of the plurality of dendritic surface features comprising a base on the first surface, wherein the plurality of dendritic surface features comprises a surface feature size at the base greater than 100 μm and less than or equal to 350 μm; and
a transmittance haze greater than or equal to 50%.

13. The textured glass article of claim 12, wherein the textured glass article has a surface roughness Ra greater than or equal to 2 μm.

14. The textured glass article of claim 12, wherein the aluminosilicate glass comprises:
greater than or equal to 52 wt % and less than or equal to 62 wt % $SiO_2$;
greater than or equal to 16 wt % and less than or equal to 28 wt % $Al_2O_3$;
greater than or equal to 0 wt % and less than or equal to 5 wt % $B_2O_3$;
greater than or equal to 8 wt % and less than or equal to 13 wt % $Na_2O$;
greater than or equal to 0 wt % and less than or equal to 0.2 wt % $K_2O$;
greater than or equal to 0 wt % and less than or equal to 4 wt % $Li_2O$; and
greater than or equal to 0 wt % and less than or equal to 1.5 wt % MgO.

15. The textured glass article of claim 12, wherein the textured glass article is an electronic device back cover.

* * * * *